(12) United States Patent
Iverson

(10) Patent No.: US 7,792,843 B2
(45) Date of Patent: Sep. 7, 2010

(54) WEB ANALYTICS DATA RANKING AND AUDIO PRESENTATION

(75) Inventor: Scott Iverson, Orem, UT (US)

(73) Assignee: Adobe Systems Incorporated, San Jose, CA (US)

( * ) Notice: Subject to any disclaimer, the term of this patent is extended or adjusted under 35 U.S.C. 154(b) by 713 days.

(21) Appl. No.: 11/315,712

(22) Filed: Dec. 21, 2005

(65) Prior Publication Data

US 2007/0143343 A1 Jun. 21, 2007

(51) Int. Cl.
*G06F 7/00* (2006.01)
(52) U.S. Cl. .............................. 707/751; 707/E17.107; 707/804; 707/E17.059
(58) Field of Classification Search ......... 704/200–278, 704/258, 260; 707/104.1, 751, 804; 379/88.13, 379/88.17; 700/94
See application file for complete search history.

(56) References Cited

U.S. PATENT DOCUMENTS

| | | | | |
|---|---|---|---|---|
| 6,707,889 | B1 * | 3/2004 | Saylor et al. | 379/88.04 |
| 6,768,788 | B1 * | 7/2004 | Langseth et al. | 379/67.1 |
| 6,829,630 | B1 * | 12/2004 | Pajak et al. | 709/201 |
| 6,940,953 | B1 * | 9/2005 | Eberle et al. | 379/88.13 |
| 7,085,682 | B1 * | 8/2006 | Heller et al. | 702/186 |
| 7,266,181 | B1 * | 9/2007 | Zirngibl et al. | 379/88.17 |
| 2001/0053944 | A1 * | 12/2001 | Marks et al. | 700/94 |
| 2002/0151998 | A1 * | 10/2002 | Kemppi et al. | 700/94 |
| 2003/0033155 | A1 * | 2/2003 | Peerson et al. | 705/1 |
| 2003/0149567 | A1 * | 8/2003 | Schmitz et al. | 704/270 |
| 2004/0167768 | A1 * | 8/2004 | Travieso et al. | 704/2 |
| 2004/0167784 | A1 * | 8/2004 | Travieso et al. | 704/270.1 |
| 2004/0215599 | A1 | 10/2004 | Apps et al. | |
| 2005/0075972 | A1 | 4/2005 | Doyle | |
| 2005/0177613 | A1 * | 8/2005 | Dresden | 709/200 |
| 2005/0256716 | A1 * | 11/2005 | Bangalore et al. | 704/260 |
| 2005/0261906 | A1 * | 11/2005 | Glinski et al. | 704/254 |
| 2006/0184410 | A1 * | 8/2006 | Ramamurthy et al. | 705/8 |
| 2006/0277212 | A1 * | 12/2006 | Error | 707/102 |
| 2006/0277585 | A1 * | 12/2006 | Error et al. | 725/112 |
| 2007/0055937 | A1 * | 3/2007 | Cancel et al. | 715/704 |
| 2007/0244650 | A1 * | 10/2007 | Gauthier | 702/19 |

OTHER PUBLICATIONS

Unknown, "Voice Command Device", Wikipedia, Published: Nov. 21, 2004.*
Unkown, "Voicemail", Wikipedia, Published: Nov. 28, 2004.*
Unkown, "Interactive Voice Response", Wikipedia, Published: Sep. 29, 2005.*

(Continued)

*Primary Examiner*—Mohammad Ali
*Assistant Examiner*—John P Hocker
(74) *Attorney, Agent, or Firm*—Robert C Kowert; Meyertons, Hood, Kivlin, Kowert & Goetzel, P.C.

(57) ABSTRACT

Tools and techniques are provided to obtain web analytics data, identify data events likely to be of interest to a user, rank identified data events, summarize data events in a form suitable for transmission to a cell phone or other limited-display mobile device, and interacting with a user of such a mobile device by sending data event summaries to the user, receiving commands from the user, and so on. Data normally presented on a computer display can be summarized into a audible format for presentation over a mobile phone speaker. Methods, systems, and other embodiments are described.

28 Claims, 4 Drawing Sheets

OTHER PUBLICATIONS

Unknown, "Speech Synthesis", Wikipedia, Published: Dec. 14, 2004.*
Unknown, "Voicemail", Wikiipedia, Published: Nov. 28, 2004 (Included as NPL on Jan. 23, 2008).*
U.S. Appl. No. 60/706,917, filed Oct. 2005, Cancel et al.*
SiteCatalyst Implementation Manual, downloaded Oct. 18, 2006 from http://w2.byuh.edu/webmasters/, copyright Oct. 28, 2005.
"Product Guide: Omniture SiteCatalyst 11", www.infoworld.com, Feb. 18, 2005.
Jackson, "Tools for data-driven management", www.gcn.com, Jul. 19, 2004.
IBM VIAVOICE Advanced 10.0, www.amazon.com, no later than Oct. 16, 2005.
"Web analytics", en.wikipedia.org, no later than Sep. 23, 2005.
ForecastPRO, www.forecastpro.com, downloaded on or about Oct. 17, 2005.
Google search results for "web analytics provider", Oct. 17, 2005.
Hurol Inan, "Measuring the Success of Your Website" (table of contents), www.hurolinan.com, copyright 2001-2005.
Boardman, "Inside Information", www.nwc.com, Aug. 5, 2004.
Statement from John W. Ogilvie, Sep. 28, 2006.
Form for PTO 1449 for U.S. Appl. No. 10/608,515 (1 sheet).
Forms for PTO 1449 for U.S. Appl. No. 10/609,008 (2 sheets).
Forms for PTO 1449 for U.S. Appl. No. 10/759,079 (2 sheets).
Forms for PTO 1449 for U.S. Appl. No. 10/794,809 (4 sheets).
Forms for PTO 1449 for U.S. Appl. No. 10/993,397 (2 sheets).
Form for PTO 1449 for U.S. Appl. No. 11/274,560 (1 sheet).
Form for PTO 1449 for U.S. Appl. No. 11/313,445 (1 sheet).
Forms for PTO 1449 for U.S. Appl. No. 11/313,588 (4 sheets).
Petition to Make Special for U.S. Appl. No. 11/313,588.
Form for PTO 1449 for U.S. Appl. No. 11/313,875 (1 sheet).
Forms for PTO 1449 for U.S. Appl. No. 11/313,970 (4 sheets).
Petition to Make Special for U.S. Appl. No. 11/313,970.
Form for PTO 1449 for U.S. Appl. No. 11/319,337 (1 sheet).
Form for PTO 1449 for U.S. Appl. No. 11/341,231 (1 sheet).
Forms for PTO 1449 for U.S. Appl. No. 11/367,198 (2 sheets).
Form for PTO 1449 for U.S. Appl. No. 11/458,313 (1 sheet).
International Search Report for PCT/US04/39253.
International Search Report for PCT/US04/06898.
International Search Report for PCT/US04/06696.
Jason I Hong et al., "WebQuilt: A Framework for Capturing and Visualizing the Web Experience", guir.berkeley.edu, May 2001.
Jason I. Hong et al., "What Did They Do? Understanding Clickstreams with the WebQuilt Visualization System", guir.berkeley.edu.
"Advertisement System, Method and Computer Program Product," IP.com, Document ID IPCOM000138557D, Jul. 24, 2006.

* cited by examiner

| VISITS (OCT 2005) | 30,316 |
| --- | --- |
| | 60% |
| CART OPENS | 18,198 |
| | 3.7% |
| ORDERS | 672 |
| REVENUE | $409,997 |
| UNITS | 767 |
(PRIOR ART)
Fig. 1
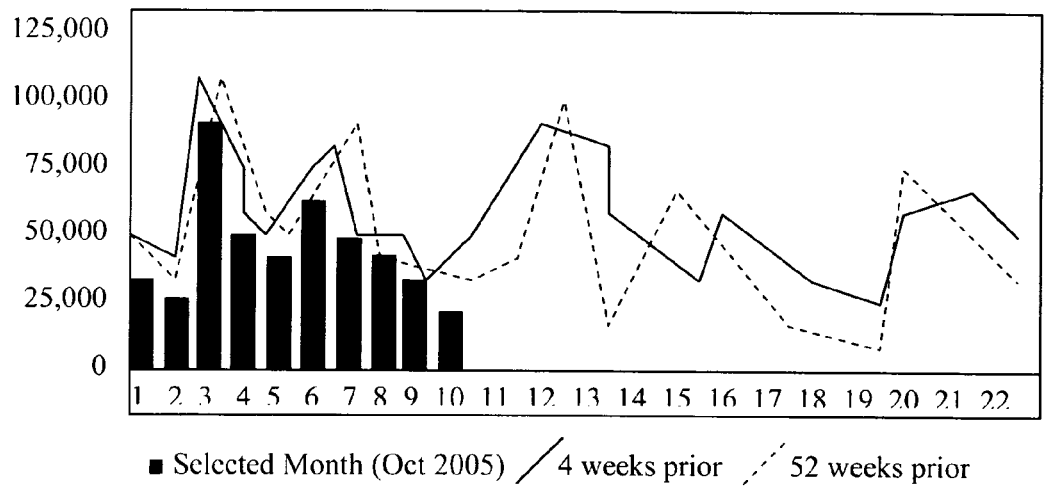
■ Selected Month (Oct 2005)　／ 4 weeks prior　．／ 52 weeks prior
(PRIOR ART)
Fig. 2
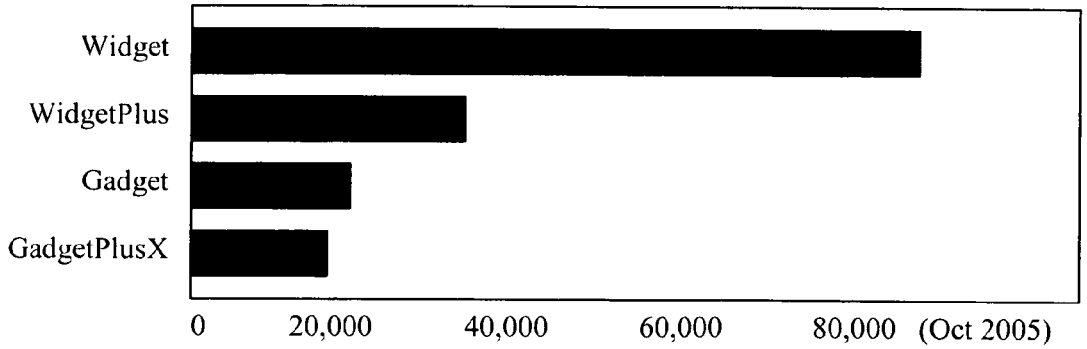
(PRIOR ART)
Fig. 3

WEB ANALYTICS DATA RANKING AND AUDIO PRESENTATION

BACKGROUND

Web analytics systems and methods gather data about web site usage, for presentation to system users. A leading web analytics provider is Omniture, Inc., of Orem, Utah, the owner of the present invention. Omniture provides web analytics technology under its mark SiteCatalyst™. Information about Omniture and other web analytics providers, and about related technology and concepts, is readily available online, e.g., through the Google® search engine. Some related concepts are also identified by U.S. trademark application Ser. No. 78232138 for the mark SITECATALYST, in a description of services reading as follows:

Market research; conducting online market research surveys relating to customer and employee satisfaction and attitude, and organizational climate or effectiveness; preparing business reports electronically relating to customer and employee satisfaction and attitude, organizational climate or effectiveness, and the use of web sites; collection, reporting, analysis and integration of data related to the use of websites and the effectiveness of marketing campaigns; computerized database management; licensing of computer software (class 35);

Computer services, namely, consultation services related to web sites; computer and website diagnostic services; tracking, analyzing, evaluating and advising others regarding website design, implementation, usability, functioning, performance, and optimization; performance monitoring services, website diagnostic services; managing and optimizing website performance and the effectiveness of online marketing campaigns; technical support, namely, monitoring network systems (class 42).

Other related concepts will be known or apparent through other sources, not least of which are references such as those of record in the present patent application.

SUMMARY

The present invention provides tools and techniques for identifying data likely to be important to users of web analytics services, ranking such data, and presenting such data interactively to users through limited-capacity or severely-limited-capacity channels. For instance, the invention provides a method of an artificial intelligence or other program using a computer processor in a web analytics system to analyze and present data representative of human activity in a web site, by obtaining data which represent human physical activity in a web site, identifying data events by analyzing the data, ranking data events relative to each other according to a web analytics system user's expected interest in them, creating summaries of data events, and sending the web analytics system user a summary of a higher ranked data event before sending the user a summary of a lower ranked data event. The method may compensate for a channel's low capacity by presenting the analytics system user with summaries of more interesting data events before presenting that user with summaries of less interesting data events.

A web analytics system of the invention analyzes and presents data representing human activity in a web site, using a data obtaining component for obtaining visual data which represent human physical activity in a web site, the data comprising electrical signals corresponding to visitor peripheral devices and visitor activities directing the peripheral devices to take action within the web site, an event identifying component for identifying at least two data events by analyzing the data, each identified data event relating to a data pattern in a manner that satisfies at least one interest criterion of the web analytics system as evident from system user actions, a ranking component for ranking at least two of the identified data events relative to each other according to interest criterion, a summarizing component for creating summaries of each of at least two ranked data events, the summaries configured for transmission over a low capacity channel, and a sending component for sending a web analytics system user, over a low capacity channel, a summary of a higher ranked data event before sending the user a summary of a lower ranked data event.

Accordingly, a method is provided for a web analytics system user to use a low capacity channel to receive from the web analytics system at least one data summary reporting on human activity in a web site, by physically operating a mobile device to make a connection to the web analytics system over the low capacity channel and to begin a session with the web analytics system; and receiving at least two data summaries of visual data, the summaries presented by the web analytics system over the low capacity channel through an output hardware component of the mobile device, without the user first specifying during this session any of the following: which data should be summarized in those summaries, what order those summaries should be presented in; thus the web analytics system automatically presents a summary of more interesting data before presenting a summary of less interesting data.

An audible summary of web site activity can be produced for a user, by obtaining visual data which represent human physical activity in a web site; identifying at least two data events by analyzing the data; ranking at least two of the identified data events relative to each other according to the user's expected interest in them; and creating at least one audible summary of at least one ranked data event, which may then be sent to the user.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

FIG. 1 is a funnel chart illustrating events and event summaries through visual data in web analytics systems in a manner familiar in the art.

FIG. 2 is a bar graph overlaying a line graph illustrating events and event summaries through visual data in web analytics systems in a manner familiar in the art.

FIG. 3 is a bar graph or histogram illustrating events and event summaries through visual data in web analytics systems in a manner familiar in the art.

DETAILED DESCRIPTION

Introduction

Figure 4:
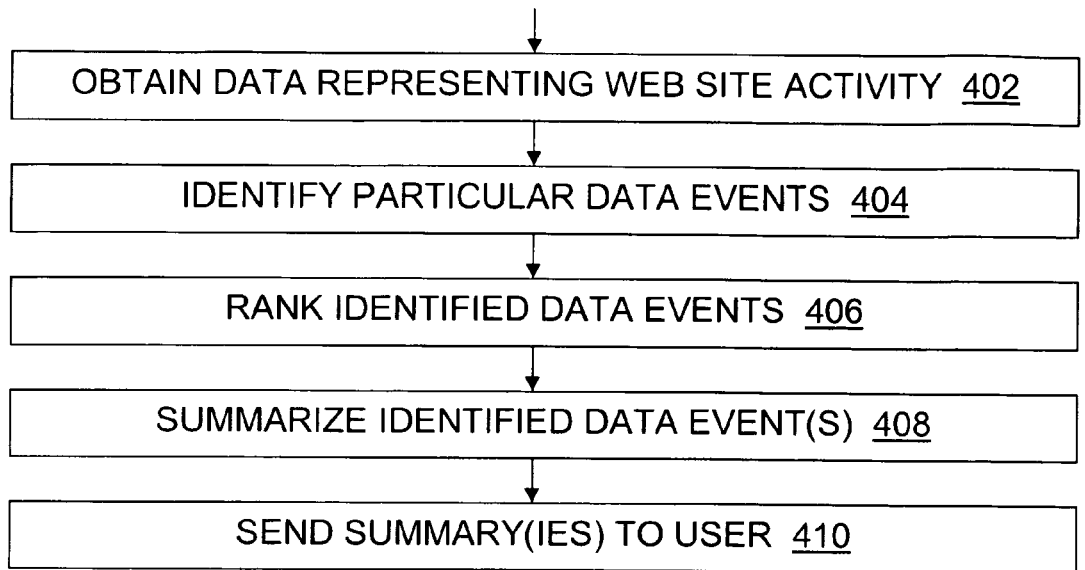
FIG. 4 is a flow chart illustrating methods using or performed by a web analytics system according to at least one embodiment of the present invention.

The present invention provides tools and techniques to help users of web analytics systems conveniently obtain updates, change report focus, and otherwise interact with their web analytics system even when the powerful visual interface they might prefer to use is not available. The invention provides summaries of web activity which are tailored for presentation over a cell phone, PDA, or other device whose capabilities—especially graphics and visualization—are more limited than a personal computer.

The invention is illustrated in discussions below and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples.

Definitions of terms are provided explicitly and implicitly throughout this document. Terms do not necessarily have the same meaning here that they have in general usage, in the usage of a particular industry, or in a particular dictionary or set of dictionaries. The inventor asserts and exercises his right to be his own lexicographer.

For instance, the "capacity" of a channel is to be considered relative to the information conveying capacity of a commonly used alternative. For web analytics, one such alternative is a computer workstation having at least a fifteen inch color monitor and other standard peripherals, and having a cable, DSL, or higher bandwidth connection to the Internet. Thus, some examples of "limited-capacity channels" as that term is used herein include channels constrained by limited visual bandwidth, such as in architectures using Wireless Application Protocol and/or Wireless Markup Language to permit some web browsing on a cell phone, PDA, or other mobile device. Transforming a rich visual presentation from a form suitable for presentation through the computer workstation monitor into a form suitable for presentation on the screen of a mobile device requires sampling the image, compressing data for transmission, omitting some data, and/or otherwise reducing the information that is visually presented to the user within a given period of time.

As used herein, a "severely-limited-capacity channel" is one which normally carries less information than another channel because of a difference in the targeted human sense. For instance, an audio channel has severely-limited-capacity relative to a visual channel because sound normally conveys less information in a given time period than sight. As many have noted, a picture is worth a thousand words; in some cases, it may be worth even more. A "low capacity channel" is one which has limited-capacity or severely-limited-capacity.

As used herein, "visual data" means data which has conventionally been presented solely or primarily in some visual form, although it may or may not be presented in visual form to a particular user of the present invention or in a particular embodiment of the present invention. Visual data is not necessarily data in a visually-oriented file format such as a bitmap, JPEG, or other picture format; the data may instead be a list of data points, or a table of numeric values, or a relational database record, for instance. Some examples of visual data include: purchase conversions and averages of the type conventionally presented in funnel graphs; revenue data conventionally presented in bar graphs or line graphs; product data showing product counts in relation to orders, revenue, or the like and conventionally presented in bar graphs or line graphs; data conventionally presented in Gantt chart, pie chart, tree, node-and-link, map, plot, or other graphical formats; data conventionally presented through the use of visualization software, rendering software, and/or animation software; tabular, matrix, histogram, trended, spectral, or other numeric data; data of the types illustrated in FIGS. 1-3 or reminiscent thereof. Data that is not "visual data" includes natural language texts (which are primarily or solely presented as sounds or as written words, not as images), sound files, music, and the like. Although visualizations of such data can be made, such data have conventionally been presented in audible form—or in some written form that represents spoken words—rather than being presented in visual form.

As used herein, "action taken within a web site" includes, without limitation, one or more of the following: navigating within the website, into it, or out of it; viewing a product or service description; displaying a newsletter; displaying a web page; placing an order for one or more goods and/or services; revising an order; canceling an order; requesting a refund; providing a credit card number, bank account number, PayPal® (mark of PayPal, Inc.) account name, and/or other funds transfer information; checking an account balance; checking a history of financial transactions and/or orders.

Methods and More

Figure 5:
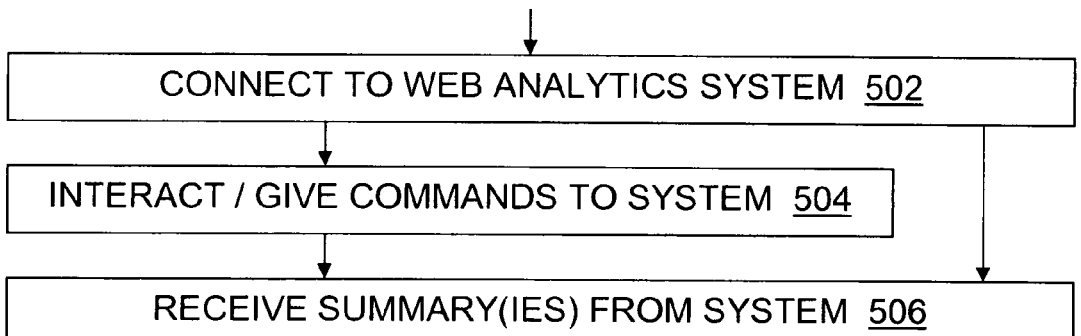
FIG. 5 is a flow chart further illustrating methods using a web analytics system according to at least one embodiment of the present invention.
Figure 6:
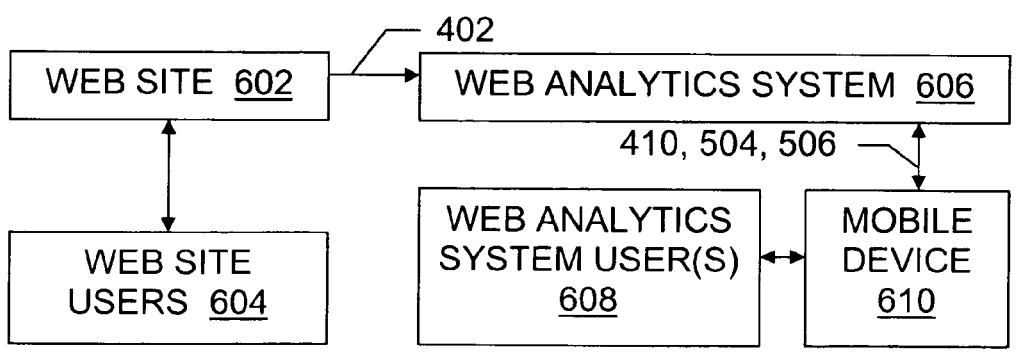
FIG. 6 is a block diagram further illustrating a web analytics system in a context according to at least one embodiment of the present invention.
Figure 7:
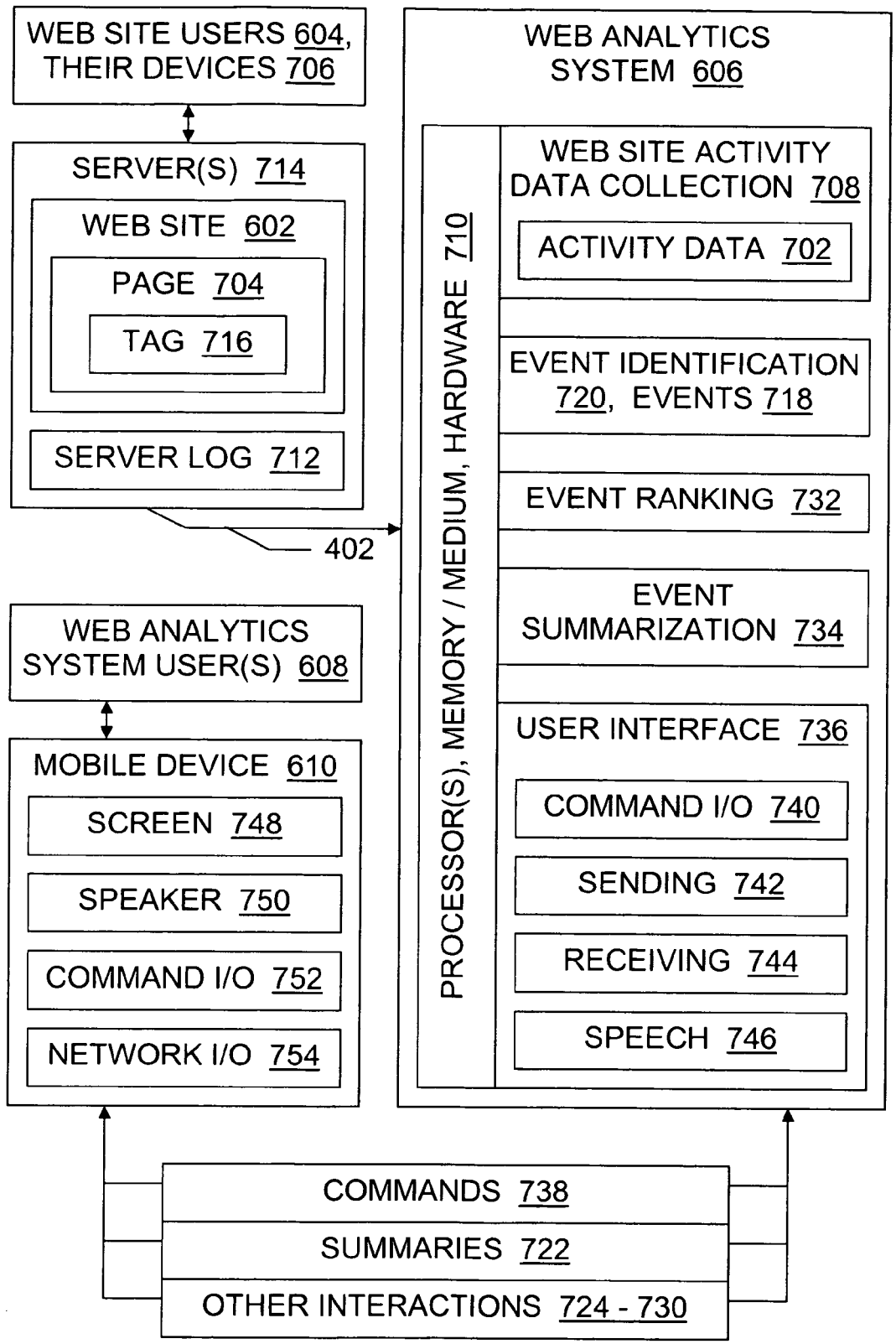
FIG. 7 is a data flow diagram, further illustrating roles, data, information flow, systems, methods, and other aspects of some embodiments of the present invention.

FIGS. 4 and 5 are flowcharts illustrating methods of the present invention for using a computer processor in a web analytics system to analyze and present data representative of human activity in a web site, and the steps illustrated therein will now be discussed. Note, however, that other drawings and discussion of other embodiments herein may also aid understanding of method embodiments, just as an understanding of methods will sometimes aid understanding of system or other non-method embodiments. Accordingly, reference is made here not only to FIGS. 4 and 5, but also to other figures.

During a data obtaining step 402, a web analytics system 606 obtains data 702 which represent user 604 activity in a web site 602. The activity data 702 may be in the form of electrical signals representing items such as a path taken by a web site visitor 604 through the web site 602, web site pages 704 displayed to the user, products and/or services ordered by visitors 604 on the web site, and/or revenue transfers authorized by visitors 604, to give just a few examples. More generally, any activity or item of a type conventionally tracked by web analytics may be represented in the activity data 702, depending of course on the particular embodiment and its implementation. Thus, the data 702 may include signals corresponding to physical objects and activities external to the web analytics system 606, including a visitor's peripheral device(s) 706 (mouse, keyboard, screen, modem, etc.) and visitor 604 activities directing a peripheral device to take action within the web site 602.

Activity data may be obtained automatically using software and/or hardware familiar in the art. For example, the web analytics system 606 may include a data obtaining component 708 which is implemented using computer processing and memory hardware 710 configured by software. Suitable software 708 may function to extract data 702 about the web site 602 from a logfile 712 maintained by a web server 714. In addition, or alternately, data collection software 708 may collect information about user activity by using HTML-tagged 716 pages 704 of the web site 602. Activity data may also be obtained by such automatic steps in combination with manual steps (tagging, copying, testing) by a web site administrator or other technical personnel, in which case the collection is still deemed "automatic" herein, as it is not fully manual.

During an event identifying step 404, the web analytics system 606 identifies data events by analyzing the activity data 702. Identified data events 718 relate to some data pattern in a manner that satisfies at least one user interest criterion of the web analytics system. That is, the system 606 identifies data events according to what it understands or expects to be of interest to the system user 608. For example, in some embodiments the system identifies it as a data event 718 when some obtained data 702 differs from corresponding historic data in at least a specified manner, such as by a specified absolute amount or a specified percentage; when data 702 is forecast to at least meet a specified target value; when data 702 is forecast to miss a specified target value; when data 702 spikes by differing in at least a specified manner (e.g., absolute amount, percentage, deviation or other statistical measure) from neighboring data 702. An absence of data 702 may also be an event 718, as when no recent (as defined by default or expressly by the user) data 702 of a specified type was obtained 402. Forecasting may be done using familiar tools, such as trend line analysis or other statistical tools. Target values are specified by a user 608, although not necessarily by the particular user to whom the system will presently report 410.

In some embodiments, data event(s) 718 may relate to one or more of the following: cart opens, abandoned carts, orders, a revenue average, a unit average, an order average, revenue during a selected time period, units of a selected product ordered, carts opened for a selected product, a relation between revenue produced by products and units sold or orders made for individual products, a top-performing product, billing, campaigns, targets, page views, alerts, visits, entries and exits, paths taken by visitors, cross selling, visitor profiles. More generally, data events 718 may relate, without limitation, to any data value or condition tracked or determined by a web analytics system familiar in the art.

Data events may be identified 404 automatically using software and/or hardware. For example, the web analytics system 606 may include a data event identification component 720 which is implemented in various embodiments using computer processing and memory hardware 710 configured by software which looks for data 702 meeting the conditions described in the preceding paragraph, and/or meeting other conditions of interest. As with obtaining data, identifying data events is considered "automatic" when partially or fully automated.

By way of example, in some embodiments the component 720 identifies any of the following as a data event: new activity data 702 of a type the user 608 has bookmarked is obtained 402; new data of a type the user has set an alert on is obtained; new data of a type the user has placed in a dashboard is obtained; new data of a type the user expressly requested during a prior session is obtained; data not yet sent to the present user has been sent 410 to other people 608 who belong to the same organization as the user 608. For present purposes, sending 410 a data summary 722 is one way to send data 702; sending 410 raw data 702 is another way to send data.

As indicated, the system 606 user 608 can generally do more than merely receive summaries 722. Depending on the embodiment, the user 608 may also be able to interact 504 in other ways, such as by setting an alert 724, placing data in a dashboard 726, bookmarking 728 data, setting a data target 730, and so on for other interactions which are noted expressly herein and/or known in prior web analytics systems.

During an event ranking step 406, the web analytics system 606 ranks data events 718 relative to each other according to the web analytics system user's expected interest in them, so that more interesting events can be presented 410 to the user 608 before less interesting ones. Events 718 may be ranked, for example, based on at least one of the following: a default ranking which can be overridden; a ranking specified by the user 608 or by a system 606 administrator, site administrator, or web administrator; prior requests by this user and/or other users 608 for particular types of data 702; bookmarks 728, alerts 724, and/or dashboards 726 specified by or for the user 608. Some embodiments lower a data event's ranking for the particular user 608 if that user renames data 702 as "not applicable", that is, not worth tracking or the like. Some embodiments rank 406 data events "by company" (that is, using rules and/or heuristics specified by a corporation or other organization for all users 608 belonging to the organization), and also rank data events 718 by individual users 608, and the ranking by company applies unless it is overridden by the individual user ranking. Some embodiments raise a data event's ranking for particular data 702 for a given user 608 if that user does 504 one or more of the following: places an alert on the data, bookmarks the data, requests more information about the data, requests or provides information about calendar events that may affect the data, instructs the web analytics system to send another user the data, places a report on the data in a dashboard, sets a target for the data. Ranking may be implemented in various embodiments using computer processing and memory hardware 710 configured by software 732 which operates as noted here. Ranking 406 data events is considered "automatic" when it is partially or fully automated.

During a data summarizing step 408, the web analytics system 606 creates summaries 722 of data events 718, which may include summaries of data 702 and descriptions of the conditions used in identifying 404 the events. In some embodiments, the summaries are configured for transmission 410 over a low capacity channel, such as a cell phone 610 connection or a wireless PDA 610 connection. Some embodiments create 408 an audible summary of visual data. In some embodiments, the web analytics system 606 prepares 408 reports 722 for subdivisions of an entity (a.k.a., an organization as that term is used herein) and prepares 408 a roll-up report for the entity including a plurality but not necessarily all of its subdivisions, the identifying step identifies 404 different values for a data 702 variable in different subdivision reports, and the summary 722 informs the user 608 that different values were identified, as the user might not otherwise notice the value difference(s). Summarizing 408 may be implemented in various embodiments using computer processing and memory hardware 710 configured by software 734 which operates as noted here. Summarizing 408 of data events is considered "automatic" when it is partially or fully automated.

Figure 8:
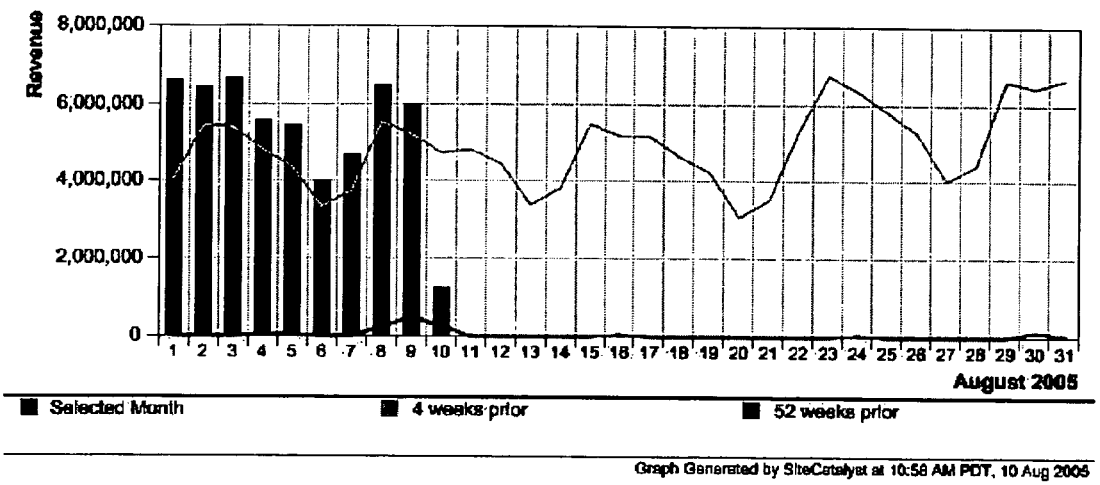
FIG. 8 is an example of a conventional graphical display of visual data, which data could also be presented in novel ways or forms to a web analytics system user according to the present invention.
Figure 9:
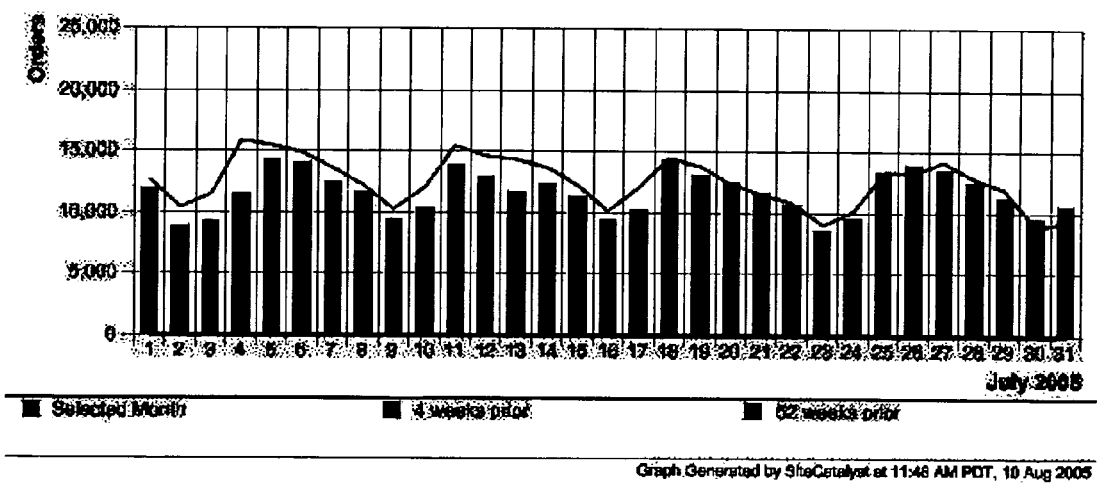
FIG. 9 is another example of a conventional graphical display of visual data, which data could also be presented in novel ways or forms to a web analytics system user according to the present invention.

By way of example, artificial intelligence or other software code within the novel web analytics system 606 might produce 402, 404, 408 and provide 410 to a user 608 the following textual and/or generated-speech summary 722 of visual data 702 that is shown in conventional graphical form in FIG. 8: "The revenue for this month shows that you have consistently surpassed your revenue of 4 weeks prior. The revenue for today is currently at $1,242,673 and is forecasted at $6M which would surpass the revenue of 4 weeks prior." This summary 722 may be provided in place of, or as a supplement to, providing the data to the user in graphical form on a laptop computer or other device that has a more powerful display than the user's mobile device 610. Likewise, the system 606 might generate the following textual and/or generated-speech summary 722 in place of, or to supplement, the data 702 that is shown in conventional graphical form in FIG. 9: "The orders for the first 17 days of July lag behind the orders for the 4 weeks prior with the 4$^{th}$ lagging by 4,500. The orders for the rest of July closely follow the orders for the 4 weeks prior. The worst day was short by 550 and the best was over by 1,200."

During a sending step 410, the web analytics system 606 sends the user 608 one or more summaries 722 of data 702. In some embodiments, the user specifies expressly which summaries to send. In some embodiments, the web analytics system 606 sends the user a summary of a higher ranked 406 data event 718 before sending the user 608 a summary of a lower ranked data event. Thus, the web analytics system may compensate for a channel's low capacity by presenting the user with summaries of more interesting data events before presenting summaries of less interesting data events.

In some embodiments, the sending step 410 sends over a low capacity channel to a mobile device 610 having a display screen 748 of lower resolution than 640 by 480 pixels in either dimension, and the summary 722 includes a low-resolution image of visual data to display on the screen 748. In some embodiments, the sending step sends to a device 610 having a speaker 750 and having no display screen with more than 400 pixels along any one dimension (the device may or may not have a smaller screen), and the summary 722 includes an audible summary of visual data 702.

More generally, the system 606 includes a user interface 736 which sends and receives commands 738, summaries 722, and other items 724-730 to and from the user's mobile device 610, and hence to and from the user 608. The user interface 736 may be implemented using computer processing and memory hardware 710, configured by software which operates as noted herein. The illustrated user interface includes a command I/O component 740 for receiving user commands (spoken, key-tone, packet, or otherwise) and directing their performance by the system 606; a sending component 742 for transmitting over a cell phone connection, wireless IP connection, or the like to a mobile device; a receiving component 744 for receiving over a cell phone connection, wireless IP connection, or the like; and a speech component 746 for generating audible summaries 722.

Hardware-only implementations of the user interface 736 and/or other system 606 components such as components 708, 720, 732, 734 may also be possible for a given embodiment. The general trade-offs between software and hardware functionality, with their attendant cost, implementation time, and other concerns, can be applied by those of skill to embodiments of the present invention.

FIG. 4 and the foregoing description generally reflect the perspective of the web analytics system 606. However, some steps described above have counterparts in the user's perspective, as illustrated in FIG. 5. Thus, the invention provides methods for a web analytics system user 608 to use a low capacity channel to receive from the web analytics system 606 at least one data summary reporting on human activity in a web site.

During a connecting step 502, the user 608 physically operates the mobile device 610 to make a connection to the web analytics system 606 over the low capacity channel and to begin a session with the web analytics system. This may be accomplished by dialing a dedicated number, surfing to a dedicated interface site on an IP network, or otherwise. A network I/O component 754 in the mobile device 610 provides connectivity, in the form of a channel which may be low capacity, such as a limited-capacity or severely-limited-capacity channel.

During an interacting step 504, the user 608 interacts with the web analytics system 606 through the mobile device 610. This may include, for example, giving 504 voice commands 738 which result in data summaries 722 being presented 410 by the web analytics system over the low capacity channel through an output hardware component of the mobile device, such as a display screen 748 and/or a speaker 750. Depending on the embodiment, other interactions 504 may include giving commands to adjust the play speed of an audible data summary 722 presentation, adjust the volume of an audible data summary presentation, repeat an audible data summary presentation, pause an audible data summary presentation, send a data summary presentation to a specified other person through email or voicemail, for instance, and/or to command the system 606 to provide more detail about some data 702 that was summarized in a data summary, such as data of that type for a different period, or raw data rather than a summary.

Commands are given through a command I/O component 752, which may be implemented in a combination of hardware and software to present command options, receive command input, provide status information, and the like. Depending on the embodiment, commands may be entered in the command I/O component 752 by speaking them so they are directed into a speech recognition module (which might be located in the system 606 interface 736), by pressing buttons which send electrical signals, by pressing a stylus to a touch screen 748, or by other computer-human interaction facilities.

During a receiving step 506 that corresponds to the sending step 410, the user 608 receives one or more summaries 722 of visual data. The summaries are presented 410 by the web analytics system 606 over the low capacity channel through an output hardware component 748, 750 of the mobile device. In some embodiments, this is done without the user first specifying during this session which data should be summarized in the summaries and/or what order those summaries should be presented in.

Systems and More

In addition to the observations above, the following may aid understanding of systems, devices, configured media, and process products of the present invention.

In some embodiments, the web analytics system 606, which is used to analyze and present data representing human 604 activity in the web site 602, includes a data obtaining means 710, 708 for obtaining visual data (as defined above) which represent human physical activity in the web site, the data 702 comprising signals corresponding to visitor peripheral devices 706 and visitor activities directing the peripheral devices to take action within the web site. The data obtaining means includes computer processing and memory hardware 710 configured by at least one of the following: software 708 which extracts data about the web site 602 from a web server 714 logfile 712, software 708 which collects information 702 using tagged pages 704 of the web site 602.

In some embodiments, the web analytics system 606 includes an event identifying means 710, 720 for identifying at least two data events by analyzing the data, each identified data event relating to a data pattern in a manner that satisfies at least one interest criterion of the web analytics system. The event identifying means includes computer processing and memory hardware 710 configured by software 720, which determines when data satisfies one or more (or some specified number, e.g., two, three, four, five, etc.) of the following conditions: data 702 differs from corresponding historic data in at least a specified manner as discussed above; data 702 is forecast to at least meet a specified target value; data 702 is forecast by the system 606 to miss a specified target value; data 702 spikes by differing in at least a specified manner from neighboring data; no recent data 702 of a specified type (units, hits, sales, subscriptions, etc.) was obtained; new data 702 of a type a user 608 has bookmarked is obtained; new data 702 of a type a user 608 has set an alert on is obtained; new data 702 of a type a user 608 has placed in a dashboard is obtained; new data 702 of a type a user 608 expressly requested 504 during a prior session with the system 6060 is obtained 402; data 702 (including data events 718) not yet sent to a particular user 608 has been sent to other people 608 who belong to the same organization (defined herein as a business, agency, institution, professional network, project team, task force, club, etc.) as the particular user.

In some embodiments, the web analytics system 606 includes a ranking means 710, 732 for ranking at least two of the identified data events relative to each other according to interest criterion. The ranking means includes computer processing and memory hardware 710 configured by software 732, which determines data event 718 ranks according to one or more (or some specified number, e.g., two, three, four, five, etc.) of the following criteria: a data event concerning a target 730 is ranked higher than a data event not involving any target; a data event concerning revenue is ranked higher than a data event not involving revenue; a data event concerning data on which an alert 724 is set is ranked higher than a data event not involving any alert; a data event concerning data which differs substantially (e.g., by a specified percentage, absolute amount, or statistical measure) from historic data and has an associated calendar event (e.g., end of quarter, holiday, natural disaster) is ranked higher (or lower) than a data event not involving a substantial difference from historic data; a data event concerning data in a user-defined dashboard is ranked higher than a data event concerning other data; a data event for data which was specifically investigated by the web analytics system user 608 during a prior session is ranked higher than a data event not involving specific investigation by the user, wherein any of the following are an example of specific investigation: specifically requesting a summary of the data, specifically requesting more information about the data after receiving a summary of the data, bookmarking a summary of the data, sending a summary of the data to another user. Other ranking rules or heuristics 732, whether default and/or user-administrator-defined, may also be used in some implementations.

In some embodiments, the web analytics system 606 includes a summarizing means 710, 734 for creating summaries of each of at least two ranked data events. The summaries 722 may be configured for transmission over a low capacity channel. The summarizing means includes computer processing and memory hardware 710 configured by software 734, which produces one or more (or some specified number, e.g., two, three, four, five, etc.) of the following audible summary statements 722 in response to the indicated condition of a given data 702 variable: a statement to the effect that the variable is falling gradually; a statement to the effect that the variable is falling sharply; a statement to the effect that the variable is rising gradually; a statement to the effect that the variable is rising sharply; a statement to the effect that the variable is likely to hit its target; a statement to the effect that the variable is likely to miss its target; a statement to the effect that the variable is different than its historic value for a stated prior time; a statement to the effect that the variable has spiked; a statement to the effect that no data was obtained for the variable; a statement whether an expected upturn for the variable occurred; a statement whether an expected downturn for the variable occurred.

In some embodiments, the web analytics system 606 includes a sending means 710, 742 for sending a web analytics system user, over a low capacity channel, a summary of a higher ranked data event before sending the user a summary of a lower ranked data event. Suitable sending means include computer processing and memory hardware 710 configured by software 742, which transmits 410 over a mobile phone 610 or other mobile device 610 connection to at least one of: a display 748 of a mobile device, a speaker 750 of the mobile device. Suitable sending means include computer processing and memory hardware 710 configured by software 742, 746, which automatically controls the pitch and emphasis of generated speech. For instance, in some embodiments the sending means does at least one of the following: emphasizes a verb in an audible data summary 722 which reports on a relationship between data and a data pattern (e.g., "sales are rising"), emphasizes a noun in an audible data summary 722 which reports on at least two compared items (e.g., "this month gadgets outsold widgets two-to-one").

Some embodiments of the invention include or provide one or more (possibly audible) summaries 722 of web site activity 702, which are produced for a user 608 by a process like that illustrated in FIG. 4, or another process discussed herein. For example, audible summaries 722 according to the invention may be produced by obtaining 402 visual data 702 which represent human 604 physical activity in a web site 602; identifying 404 data events 718 by automatically analyzing the data; ranking 406 data events relative to each other according to the user's expected interest in them; and creating 408 at least one audible summary of at least one ranked data event. The summary production process may further include sending 410 the user the audible summary of the ranked data event, whereby the web analytics system 606 produces the audible summary for the user.

Summaries 722 thus produced, or otherwise produced with the invention, may include one or more statements like those noted above, e.g., a statement to the effect that a variable is falling, a statement to the effect that the variable is falling gradually, a statement to the effect that the variable is falling sharply, a statement to the effect that a variable is rising, a statement to the effect that the variable is rising gradually, a statement to the effect that the variable is rising sharply, a statement to the effect that a variable is likely to hit its target, a statement to the effect that the variable is likely to miss its target, a statement to the effect that a variable is different than its historic value for a stated prior time, a statement to the effect that a variable has spiked, a statement to the effect that no data was obtained for a variable, a statement whether an expected upturn for a variable occurred, a statement whether an expected downturn for the variable occurred. The variable may be a data 702 variable such as revenue, conversions, product units, unique visitors, visits, page views, or other variables tracked by familiar web analytics systems. The audible summary may contain audible emphasis on one or more words, the emphasis having a position in the summary (e.g., which word is emphasized in a sentence), the position being set during the creating step 408.

Other embodiments of the invention are in the form of a computer-readable storage medium 710, volatile or nonvolatile, fixed or removable, which is configured by at least software, to work in conjunction with a processor to perform a process for analyzing and presenting data that represents human activity in a web site, the process including obtaining 402 visual data, identifying 404 data events, ranking 406 identified data events, creating 408 summary(ies), and/or sending 410 summary(ies) to the user.

As noted above, steps and other features are not necessarily limited to a particular embodiment, except as required for operability and/or required by the claims. Thus, the features of methods, process products, and/or systems may likewise appear in one another and/or in configured storage media.

CONCLUSION

Although particular embodiments of the present invention are expressly illustrated and described herein as methods, for instance, it will be appreciated that discussion of one type of embodiment also generally extends to other embodiment types. For instance, the descriptions of web site analytics methods also help describe web site analytics systems. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "mobile device" and "ranking" are inclusive of one or more of the indicated item or step. In particular, in the claims a reference to an item generally means at least one such item is present and a reference to a step means at least one instance of the step is performed.

I claim:

1. A method of using a computer processor in a web analytics system, the method comprising:
    automatically obtaining, for use in a web analytics system which has a web analytics system user, activity data which represent activity by people other than the web analytics system user who are visitors in a web site, the activity data comprising signals corresponding to physical objects and activities external to the web analytics system including visitor peripheral devices and visitor activities of multiple people directing their respective peripheral devices to take action within the web site, wherein the activity data indicates at least one of the following: a path taken through the web site, web site pages displayed, products and/or services ordered in the web site, or revenue transfers authorized in the web site;
    automatically identifying at least two data events by analyzing the activity data, wherein each one of the at least two data events indicates at least one of the following:
        that obtained activity data differs from corresponding historic activity data in at least a specified manner;
        that obtained activity data is forecast to at least meet a specified target value;
        that obtained activity data is forecast to miss a specified target value;
        that obtained activity data includes spikes which differ from neighboring activity data in at least a specified manner;
        that recent activity data of a specified type was not obtained; or
        that new activity data which matches a data type specified by the web analytics system user was obtained;
    automatically ranking at least two of the identified data events relative to each other according to the web analytics system user's expected interest in them;
    automatically creating summaries of each of at least two ranked data events, the summaries configured for transmission over a low capacity channel; and
    sending the web analytics system user a summary of a higher ranked data event before sending the user a summary of a lower ranked data event;
    whereby the web analytics system compensates for the channel's low capacity by presenting the web analytics system user with summaries of more interesting data events before presenting summaries of less interesting data events.

2. The method of claim 1, wherein at least one of the at least two data events indicates that new activity data which matches a data type specified by the web analytics system user was obtained, wherein the data type specified by the web analytics system user is at least one of the following:
    data the user has bookmarked;
    data the user has set an alert on;
    data the user has placed in a dashboard;
    data the user expressly requested during a prior session; or
    data not yet sent to the user which has been sent to other people who belong to the same organization as the user.

3. The method of claim 1, wherein the method automatically ranks data events based on at least one of the following: a default ranking which can be overridden; a ranking specified by the user; prior requests by the user for particular types of data; bookmarks, alerts, and/or dashboards specified by or for the user.

4. The method of claim 1, wherein automatically creating summaries comprises creating an audible summary of visual data.

5. A method for a web analytics system user to use a low capacity channel to receive from the web analytics system at least one data summary reporting on activity in a web site by other people, the method comprising:
    physically operating a mobile device to make a connection to the web analytics system over the low capacity channel and to begin a session with the web analytics system; and
    receiving at least two data summaries of activity data representing web site activity by multiple people other than the web analytics system user, wherein the activity data indicates at least one of the following: a path taken through the web site, web site pages displayed, products and/or services ordered in the web site, or revenue transfers authorized in the web site, the summaries presented by the web analytics system over the low capacity channel through an output hardware component of the mobile device, without the user first specifying during this session any of the following: which data should be summarized in those summaries, what order those summaries should be presented in;

wherein the at least two data summaries summarize at least two data events identified from the activity data, wherein each one of the at least two data events indicates at least one of the following:
that obtained visual data differs from corresponding historic visual data in at least a specified manner;
that obtained visual data is forecast to at least meet a specified target value;
that obtained visual data is forecast to miss a specified target value;
that obtained visual data includes spikes which differ from neighboring visual data in at least a specified manner;
that recent visual data of a specified type was not obtained; or
that new visual data which matches a data type specified by the web analytics system user was obtained; and wherein the at least two data events are ranked relative to each other according to the web analytics system user's expected interest in them, wherein said receiving comprises receiving a summary of a higher ranked data event before a summary of a lower ranked data event whereby the web analytics system automatically presents a summary of more interesting data before presenting a summary of less interesting data to compensate for the channel's low capacity.

6. The method of claim 5, further comprising interacting with the web analytics system through the mobile device at least in part by giving voice commands which result in data summaries being presented by the web analytics system over the low capacity channel through the output hardware component of the mobile device.

7. The method of claim 5, further comprising interacting with the web analytics system through the mobile device at least in part by giving commands to provide at least three of the following results: adjust speed of an audible data summary presentation, adjust volume of an audible data summary presentation, repeat an audible data summary presentation, pause an audible data summary presentation, send a data summary presentation to a specified other person, provide more detail about some data that was summarized in a data summary.

8. A web analytics system to analyze and present data representing human activity in a web site, comprising:
a data obtaining means for obtaining visual data which represent physical activity by visitors in a web site, the visual data comprising signals corresponding to visitor peripheral devices and visitor activities directing the peripheral devices to take action within the web site, wherein the visual data indicates at least one of the following: a path taken through the web site, web site pages displayed, products and/or services ordered in the web site, or revenue transfers authorized in the web site;
an event identifying means for identifying at least two data events by analyzing the visual data according to expected interest of a web analytics system user who is not necessarily a visitor to the web site, wherein each one of the at least two data events indicates at least one of the following:
that obtained visual data differs from corresponding historic visual data in at least a specified manner;
that obtained visual data is forecast to at least meet a specified target value;
that obtained visual data is forecast to miss a specified target value;
that obtained visual data includes spikes which differ from neighboring visual data in at least a specified manner;
that recent visual data of a specified type was not obtained; or
that new visual data which matches a data type specified by the web analytics system user was obtained;
a ranking means for ranking at least two of the identified data events relative to each other according to the web analytics system user's expected interest in them;
a summarizing means for creating summaries of each of at least two data events, the summaries configured for transmission over a low capacity channel; and
a sending means for sending the web analytics system user, over the low capacity channel, a summary of a higher ranked data event before sending the web analytics system user a summary of a lower ranked data event, wherein the web analytics system compensates for the channel's low capacity by presenting the web analytics system user with summaries of more interesting data events before presenting summaries of less interesting data events.

9. The system of claim 8, wherein the data obtaining means comprises computer processing and memory hardware configured by at least one of the following: software which extracts data about the web site from a web server logfile, software which collects information using tagged pages of the web site.

10. The system of claim 8, wherein at least one of the at least two data events indicates that new visual data which matches a data type specified by the web analytics system user was obtained, wherein the data type specified by the web analytics system user is at least one of the following:
data the user has bookmarked;
data the user has set an alert on;
data the user has placed in a dashboard;
data the user expressly requested during a prior session; or
data not yet sent to the user which has been sent to other people who belong to the same organization as the user.

11. The system of claim 8, further comprising a ranking means for ranking at least two of the identified data events relative to each other according to expected user interest.

12. The system of claim 11, wherein the ranking means comprises computer processing and memory hardware configured by software, which determines data event ranks according to at least two of the following criteria:
a data event concerning a target is ranked higher than a data event not involving any target;
a data event concerning revenue is ranked higher than a data event not involving revenue;
a data event concerning data on which an alert is set is ranked higher than a data event not involving any alert;
a data event concerning data which differs substantially from historic data and has an associated calendar event is ranked relative to a data event not involving a substantial difference from historic data;
a data event for data which was specifically investigated by the web analytics system user during a prior session is ranked higher than a data event not involving specific investigation by the user, wherein any of the following are an example of specific investigation: specifically requesting a summary of the data, specifically requesting more information about the data after receiving a summary of the data, bookmarking a summary of the data, sending a summary of the data to another user;
a data event concerning data in a user-defined dashboard is ranked higher than a data event concerning other data.

13. The system of claim 8, wherein the summarizing means comprises computer processing and memory hardware configured by software, which produces at least three of the following audible summary statements in response to the indicated condition of a given variable:
   a statement to the effect that the variable is falling gradually;
   a statement to the effect that the variable is falling sharply;
   a statement to the effect that the variable is rising gradually;
   a statement to the effect that the variable is rising sharply;
   a statement to the effect that the variable is likely to hit its target;
   a statement to the effect that the variable is likely to miss its target;
   a statement to the effect that the variable is different than its historic value for a stated prior time;
   a statement to the effect that the variable has spiked;
   a statement to the effect that no data was obtained for the variable;
   a statement whether an expected upturn for the variable occurred;
   a statement whether an expected downturn for the variable occurred.

14. The system of claim 8, wherein the sending means comprises computer processing and memory hardware configured by software, which transmits over a mobile device connection to at least one of: a display of a mobile device, a speaker of the mobile device.

15. The system of claim 8, wherein the sending means comprises computer processing and memory hardware configured by software, which automatically controls the pitch and emphasis of generated speech.

16. The system of claim 15, wherein the sending means does at least one of the following: emphasizes a verb in a data summary which reports on a relationship between data and a data pattern, emphasizes a noun in a data summary which reports on at least two compared items.

17. An audible summary of web site activity produced for a web analytics system user, the audible summary produced by a process comprising:
   obtaining visual data which represent human physical activity in a web site, the visual data comprising signals representing visitor activities by a plurality of people, other than the web analytics system user, directing peripheral devices to take action within the web site, wherein the visual data indicates at least one of the following: a path taken through the web site, web site pages displayed, products and/or services ordered in the web site, or revenue transfers authorized in the web site;
   identifying at least two data events by analyzing the visual data, each identified data event relating to a data pattern in a manner that satisfies at least one interest criterion of the web analytics system user, wherein each one of the at least two data events indicates at least one of the following:
      that obtained visual data differs from corresponding historic visual data in at least a specified manner;
      that obtained visual data is forecast to at least meet a specified target value;
      that obtained visual data is forecast to miss a specified target value;
      that obtained visual data includes spikes which differ from neighboring visual data in at least a specified manner;
      that recent visual data of a specified type was not obtained; or
      that new visual data which matches a data type specified by the web analytics system user was obtained;
   ranking at least two of the identified data events relative to each other according to the web analytics system user's expected interest in them;
   creating at least one audible summary of at least two ranked data events, wherein the summaries are configured for transmission over a low capacity channel; and
   sending the web analytics system user a summary of a higher ranked data event before sending the web analytics system user a summary of a lower ranked data event, wherein the web analytics system compensates for the channel's low capacity by presenting the user with summaries of more interesting data events before presenting summaries of less interesting data events.

18. The audible summary of claim 17, comprising at least one of the following:
   a statement to the effect that a variable is falling;
   a statement to the effect that the variable is falling gradually;
   a statement to the effect that the variable is falling sharply;
   a statement to the effect that a variable is rising;
   a statement to the effect that the variable is rising gradually;
   a statement to the effect that the variable is rising sharply;
   a statement to the effect that a variable is likely to hit its target;
   a statement to the effect that the variable is likely to miss its target;
   a statement to the effect that a variable is different than its historic value for a stated prior time;
   a statement to the effect that a variable has spiked;
   a statement to the effect that no data was obtained for a variable;
   a statement whether an expected upturn for a variable occurred;
   a statement whether an expected downturn for the variable occurred.

19. The audible summary of claim 18, wherein the variable is one of the following: revenue, conversions, product units, unique visitors, visits, page views.

20. The audible summary of claim 17, wherein the audible summary contains an audible emphasis on at least one word.

21. A computer-readable storage medium which is configured to work in conjunction with a processor to perform a process for analyzing and presenting data that represents human activity in a web site, the process comprising:
   obtaining visual data which represent human physical activity by a plurality of visitors in a web site, the visual data comprising signals corresponding to physical objects and activities external to a web analytics system including visitor peripheral devices and visitor activities directing the peripheral devices to take action within the web site, wherein the visual data indicates at least one of the following: a path taken through the web site, web site pages displayed, products and/or services ordered in the web site, or revenue transfers authorized in the web site;
   identifying at least two data events by analyzing the visual data, wherein each one of the at least two data events indicates at least one of the following:
      that obtained visual data differs from corresponding historic visual data in at least a specified manner;

that obtained visual data is forecast to at least meet a specified target value;

that obtained visual data is forecast to miss a specified target value;

that obtained visual data includes spikes which differ from neighboring visual data in at least a specified manner;

that recent visual data of a specified type was not obtained; or that new visual data which matches a data type specified by a web analytics system user was obtained ranking at least two of the identified data events relative to each other according to the web analytics system user's expected interest in them;

creating summaries of each of the at least two ranked data events, the summaries configured for transmission over a low capacity channel; and sending the web analytics system user a summary of a higher ranked data event before sending the web analytics system user a summary of a lower ranked data event, wherein the web analytics system compensates for the channel's low capacity by presenting the web analytics system user with summaries of more interesting data events before presenting summaries of less interesting data events.

22. The configured medium of claim 21, wherein the process further comprises identifying data event(s) relating to at least two of the following: cart opens, abandoned carts, orders, a revenue average, a unit average, an order average, revenue during a selected time period, units of a selected product ordered, carts opened for a selected product, a relation between revenue produced by products and units sold or orders made for individual products, a top-performing product, billing, campaigns, targets, page views, alerts, visits, entries and exits, paths taken by visitors, cross selling, visitor profiles.

23. The configured medium of claim 21, wherein the process further comprises sending a data event summary over a low capacity channel to a mobile device having a display screen of lower resolution than 640 by 480 pixels in either dimension, and the data event summary includes a low-resolution image of visual data to display on the screen.

24. The configured medium of claim 21, wherein the process further comprises sending a data event summary to a device having a speaker and having no display screen with more than 400 pixels along any one dimension, and the data event summary includes an audible summary of visual data.

25. The configured medium of claim 21, wherein the process comprises lowering data event ranking for the user if the user renames data as not applicable.

26. The configured medium of claim 21, wherein the process comprises ranking data events by company, and also ranking data events by individual users, and the ranking by company applies unless overridden by the individual user ranking.

27. The configured medium of claim 21, wherein the process comprises raising data event ranking for particular data for a given user if the user does one or more of the following: places an alert on the data, bookmarks the data, requests more information about the data, requests or provides information about calendar events that may affect the data, instructs the web analytics system to send another user the data, places a report on the data in a dashboard, sets a target for the data.

28. The configured medium of claim 21, wherein the web analytics system prepares reports for subdivisions of an entity and prepares a roll-up report for the entity, the identifying step identifies different values for a variable in different subdivision reports, and a summary informs a user that different values were identified.

* * * * *